US012407887B2

United States Patent
Kang

(10) Patent No.: US 12,407,887 B2
(45) Date of Patent: Sep. 2, 2025

(54) LOCATION-BASED VIDEO SERVICE SERVER AND SYSTEM

(71) Applicant: ALLTHESTREET, INC., Seoul (KR)

(72) Inventor: Young Joon Kang, Gyeonggi-do (KR)

(73) Assignee: ALLTHESTREET, INC., Seoul (KR)

( * ) Notice: Subject to any disclaimer, the term of this patent is extended or adjusted under 35 U.S.C. 154(b) by 15 days.

(21) Appl. No.: 18/686,948

(22) PCT Filed: Aug. 30, 2022

(86) PCT No.: PCT/KR2022/012979
§ 371 (c)(1),
(2) Date: Feb. 27, 2024

(87) PCT Pub. No.: WO2023/033526
PCT Pub. Date: Mar. 9, 2023

(65) Prior Publication Data
US 2024/0364952 A1   Oct. 31, 2024

(30) Foreign Application Priority Data

Aug. 30, 2021 (KR) ......................... 10-2021-0114543

(51) Int. Cl.
*H04N 21/262* (2011.01)
*H04N 21/239* (2011.01)

(52) U.S. Cl.
CPC ... *H04N 21/26258* (2013.01); *H04N 21/2393* (2013.01)

(58) Field of Classification Search
None
See application file for complete search history.

(56) References Cited

U.S. PATENT DOCUMENTS 10,146,748 B1 * 12/2018 Barndollar ............ G06F 16/487
2007/0273558 A1 * 11/2007 Smith .................. G08G 1/0962
340/995.1

(Continued)

FOREIGN PATENT DOCUMENTS

JP         2017-192046 A    10/2017
KR    10-2009-0068494 A     6/2009

(Continued)

OTHER PUBLICATIONS

International Search Report for PCT/KR2022/012979 mailed on Dec. 6, 2022.

*Primary Examiner* — James R Marandi
(74) *Attorney, Agent, or Firm* — The PL Law Group, PLLC

(57) ABSTRACT

A location-based video service server includes a database, a data registration processor to determine a branch point in a specific area and match and register an ID of the determined branch point and location information on a map, perform processing and ID assignment for each of a video provided from a video providing server, and match and manage a spot associated with each video, branch point information for each timeline, and information on an entire movement line connecting branch points of all timelines, and a video provider to provide a spot and a map of a corresponding area matched to the location-related search word when a location-related search word is received from a user terminal, generate a playlist by searching a video including at least one spot selected by a user in response to a request for the video including the spot, and provide the video according to the playlist.

19 Claims, 11 Drawing Sheets

(56) References Cited

U.S. PATENT DOCUMENTS

| | | | | |
|---|---|---|---|---|
| 2009/0005080 A1* | 1/2009 | Forstall | ............... | H04M 1/2477 |
| | | | | 455/456.3 |
| 2012/0066035 A1* | 3/2012 | Stanger | ............... | G01S 5/02521 |
| | | | | 705/14.1 |
| 2015/0245168 A1* | 8/2015 | Martin | ................... | H04W 4/029 |
| | | | | 715/751 |
| 2022/0374849 A1* | 11/2022 | Rathod | ................ | G07G 1/0036 |

FOREIGN PATENT DOCUMENTS

| | | |
|---|---|---|
| KR | 10-2011-0098531 A | 9/2011 |
| KR | 10-2018-0035134 A | 4/2018 |
| KR | 10-2021-0020513 A | 2/2021 |

\* cited by examiner

LOCATION-BASED VIDEO SERVICE SERVER AND SYSTEM

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/012979 filed on Aug. 30, 2022, which claims priority to the benefit of Korean Patent Application No. 10-2021-0114543 filed on Aug. 30, 2021, in the Korean Intellectual Property Office, the entire contents of which are incorporated herein by reference.

BACKGROUND

1. Technical Field

Embodiments of the present invention relate to a location-based video service server and system.

2. Background Art

As various ways to access cultural content expand, currently, services providing various types of videos freely registered by individuals or businesses online through wired and wireless communications are being provided.

Meanwhile, the popularization of mobile phones and the development of mobile communication technology have made it easier to produce and use media. For example, creators who produce video content produce content in all fields, including food, games, music, and travel, as well as vlogs about their daily lives and expose the content to consumers, allowing them to select and consume content that suits their tastes among a variety of video content.

However, the majority of video content is produced from the perspective of the producer, not the consumer, and in most cases, themes and plans are mixed. Accordingly, when selecting a video, consumers have no choice but to infer the contents of the video only based on the title and video thumbnail, making it difficult to search the video they want to watch, and in particular, when an area is introduced or movement to a location is contained in video content, the corresponding location in a video is often unclear. Therefore, there is a problem in that it is not easy to find videos that contain a viewer's individual tastes, themes, and desired locations, and it takes a lot of time to find useful information.

SUMMARY

Embodiments of the present invention are intended to provide a user-customized location-based video service server and system that provide a video of sequentially passing through locations selected by a user.

In addition, embodiments of the present invention are intended to link location information in units of branch points to a video that does not include location information and register theme events related to a place, providing information on nearby travel spots or areas according to the theme of the user's preference, and encouraging visits thereto.

In addition, embodiments of the present invention are intended to, when there is no video containing a spot desired by the user, allow the user to produce a video containing the spot, and to pay or receive compensation related to the video.

According to an exemplary embodiment of the present invention, a location-based video service system includes a location-based video service server configured to register at least one of a branch point, a spot, a video, location information, and a combination thereof and generate and provide at least one video corresponding to location information matched to a location-related search word as a playlist according to a timeline when a video request is received from a user terminal based on at least one of the location-related search word and the spot, the video included in the playlist including all of the spots selected by a user and a video providing server configured to store at least one video and provide the stored video according to a request from the location-based video service server.

The location-based video service server may include a database, a data registration processor configured to determine a branch point in a specific area and match and register an identification (ID) of the determined branch point and location information on a map, perform processing and ID assignment for each of the at least one video provided from the video providing server according to a preset processing standard, and match and manage a spot associated with each video, branch point information for each timeline, and information on an entire movement line connecting branch points of all timelines, and a video provider configured to provide a spot list and a map of a corresponding area matched to the location-related search word when the location-related search word is received from the user terminal, generate a playlist by searching a video including at least one spot selected by the user in response to a request for the video including the at least one spot, and provide the video according to the playlist.

The data registration processor may designate the branch point on the map that occurs while a pedestrian is moving on foot or through other means of transportation including a vehicle, and matches location information including global positioning system (GPS) coordinates and altitude information of the designated branch point and an ID of the branch point and stores and manages the matched location information and ID in the database.

The data registration processor may set a movement route of the video in units of branch points by matching a video playback timeline with the ID of the branch point selected on the map when the video is registered.

When the video is processed, the data registration processor may add, edit, or delete, based on the preset processing standard, video information including a video's title, creation date, registrant, thumbnail, theme, playback time, editing language, subtitle, resolution, hashtag, file size, file format, source location, streaming URL information, area, and included spots for each video, and classify each video according to classification criteria including a chronological order, a theme according to nature of delivered content, a temporary event, a season, and weather and assign a hashtag.

When the location information about the branch point is set, the data registration processor may specify a radius range corresponding to the location information about the branch point.

The spot may include a business place, a facility, and a public place, including a tourist attraction, a historical site, a performance hall, a restaurant, a store, a market, a shopping mall, a service facility, an accommodation, an amusement facility, a festival site, a bus stop, and a subway station, and the data registration processor may match at least two of location information including GPS coordinates and altitude information of the registered spot, spot content information, spot content use-related information including user reviews, and related videos, and store and manage the matched at least two in the database.

The location-based video service server may further include an event processor configured to perform control such that pre-generated event information matched to location information about the spot and location information about the branch point is executed or stopped as a real-time location changes with playback according to a playback timeline of the video.

The event processor may perform control such that, when the video is played, at least one of a marker indicating a spot on the map, detailed information including at least one of a photo, a name, a star rating, and discount information about a nearby spot based on a playback location of the video, an additional video including an indoor video of the nearby spot, a video for detailed explanation, and a promotional video, and a combination thereof is output together or output thereof is stopped.

The event processor may arbitrarily control a video playback speed when the video is played, and may control a video playback time point by arbitrarily moving a marker indicating a current location on the map on a line indicated by the user or provide a video list of a new line passing through a point when a marker is located in an area corresponding to the point beyond the indicated line.

The location-based video service server may further include a data statistics processor configured to generate search word-related customized search information to be provided when a search word is input by collecting any one of the search word input by the user, a spot to be passed through, a video requested to be provided, and a combination thereof through the video provider and designating or cancelling a search word group or generating a search word hashtag based on the collected one.

The video provider may generate the playlist to include all of at least one spot selected by the user by combining a plurality of videos in units of branch points when there is no video including all of the at least one spot in pre-stored videos.

The video provider may display and provide the number of spots included in the video, a video playback time, and a movement line on the map before the video is played according to the playlist.

The location-related search word may include an area, an address, a place, a landmark, or a theme.

When the location-related search word is the theme, the video provider may generate a spot list so that a spot highly related to the theme is preferentially exposed or generate a spot list according to spot list generation criteria preset in relation to the theme when the spot and the map are provided and provide the spot list.

The location-based video service server may further include a content transaction processor configured to, when there is no video including at least one spot selected by the user in pre-stored videos, transmit a new video registration request including the corresponding spot to the user terminal or the video providing server, and then store a returned new video in the database and calculate a cost for the new video.

The location-based video service system may further include user terminal for transmitting and receiving information by being communicatively connected to the location-based video service server, generating commands for location-based video services, including inputting the location-related search word and requesting a video, and outputting location-based video service-related information transmitted from the location-based video service server.

According to an exemplary embodiment of the present invention, a location-based video service server includes a database, a data registration processor configured to determine a branch point in a specific area and match and register an ID of the determined branch point and location information on a map, perform processing and ID assignment for each of at least one video provided from a video providing server according to a preset processing standard, and match and manage a spot associated with each video, branch point information for each timeline, and information on an entire movement line connecting branch points of all timelines, and a video provider configured to provide a spot and a map of a corresponding area matched to the location-related search word when a location-related search word is received from a user terminal, generate a playlist by searching a video including at least one spot selected by a user in response to a request for the video including the spot, and provide the video according to the playlist.

The location-based video service server may further include an event processor configured to perform control such that pre-generated event information matched to location information about the spot and location information about the branch point is executed or stopped as a real-time location changes with playback according to a timeline of the video.

The location-based video service server may further include a data statistics processor configured to generate search word-relate customized search information to be provided when a search word is input by collecting any one of the search word input by the user, a spot to be passed through, a video, and a combination thereof through the video provider and designating or cancelling a search word group or generating a search word hashtag based on the collected one.

The location-based video service server may further include a content transaction processor configured to, when there is no video including at least one spot selected by the user in pre-stored videos, transmit a new video registration request including the corresponding spot to the user terminal or the video providing server, and then store a returned new video in the database and calculate a cost for the new video.

According to the embodiments of the present invention, an effect can be expected that a user is able to easily identify spots and movement routes included in a video by searching for a desired location or theme and to watch a video reflecting a customized playlist via a selected spot.

In addition, in the embodiments of the present invention, while watching a video, a user can watch additional information, including nearby places or indoor videos of spots that appear on the screen, without a separate search, and at the same time, a spot operator can promote his or her own spot.

In addition, in the embodiments of the present invention, an effect can be expected that, by providing online services based on the real-world, various communication, commerce, promotion, and viewing can be carried out between online users or between users and business owners and additionally, transactions or visits can be induced.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only for illustrative purposes and the present invention is not limited thereto.

In describing the embodiments of the present invention, when it is determined that detailed descriptions of known technology related to the present invention may unnecessarily obscure the gist of the present invention, the detailed descriptions thereof will be omitted. The terms used below are defined in consideration of functions in the present invention, but may be changed depending on the customary practice, the intention of a user or operator, or the like. Thus, the definitions should be determined based on the overall content of the present specification. The terms used herein are only for describing the embodiments of the present invention, and should not be construed as limitative. Unless expressly used otherwise, a singular form includes a plural form. In the present description, the terms "including", "comprising", or the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
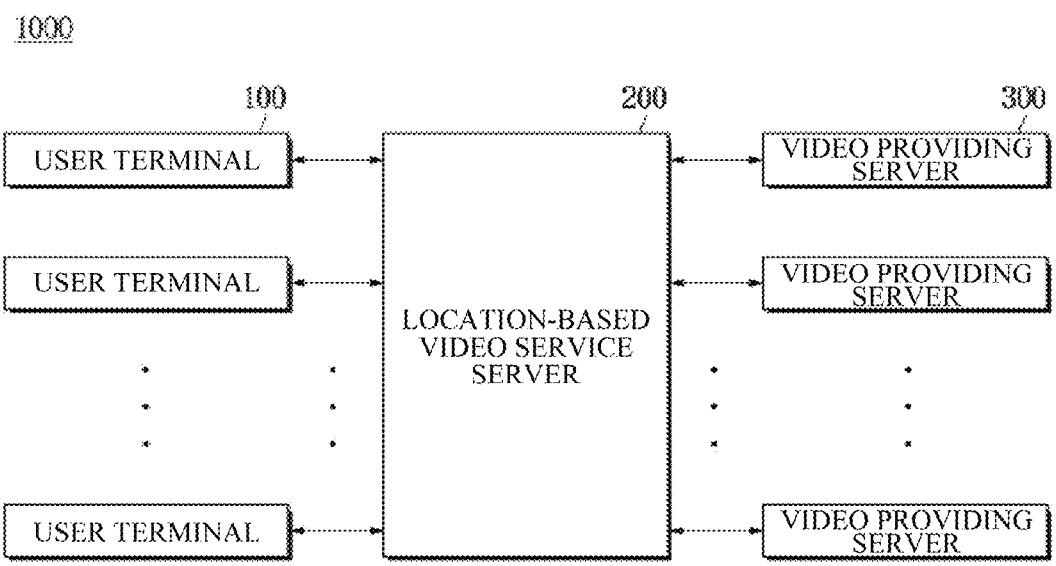
FIG. 1 is a block diagram for describing a location-based video service system according to one embodiment of the present invention.
Figure 2:
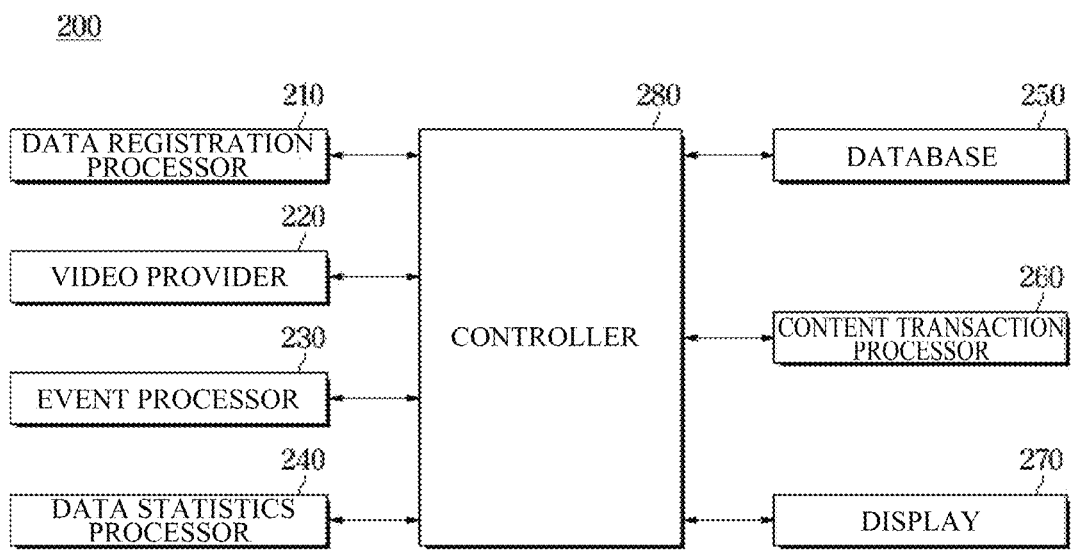
FIG. 2 is a block diagram for describing a location-based video service server according to one embodiment of the present invention.

FIG. 1 is a block diagram for describing a location-based video service system according to one embodiment of the present invention, and FIG. 2 is a block diagram for describing a location-based video service server according to one embodiment of the present invention.

Referring to FIG. 1, a location-based video service system 1000 includes user terminals 100, a location-based video service server 200, and video providing servers 300.

The user terminal 100 may be an element for transmitting and receiving information by being communicatively connected to the location-based video service server 200, generating commands for location-based video services, including entering location-related search words and requesting videos, and outputting location-based video service-related information transmitted from the location-based video service server 200. The user terminal 100 according to one embodiment of the present invention may provide a location-based video service according to a user's request through an installed application, but is not limited thereto. In this case, the application may be produced and distributed by the location-based video service server 200, but is not limited thereto. The location-related search words may include, but is not limited to, an area, an address, a place, a landmark, or a theme. That is, any location-related search word is possible as long as it allows the user to identify the location he or she wants to watch.

The location-based video service server 200 may register at least one of a branch point, a spot, a video, location information, and a combination thereof and generate and provide at least one video corresponding to location information matched to a location-related search word as a playlist according to a timeline when a video request is received from the user terminal 100 based on at least one of the location-related search word and the spot. In this case, the location-based video service server 200 may ensure that the video included in the playlist includes all of at least one spot selected by the user.

Referring to FIG. 2, the location-based video service server 200 may include a data registration processor 210, a video provider 220, an event processor 230, a data statistics processor 240, a database 250, a content transaction processor 260, a display 270, and a controller 280.

The data registration processor 210 may designate a branch point on a map that occurs while a pedestrian is moving on foot or by other means of transportation including a vehicle, and match location information including global positioning system (GPS) coordinates and altitude information of the designated branch point and an ID of the branch point and store and manage the matched data in the database 250. In this case, the altitude information may include floors, but is not limited thereto.

Figure 3:
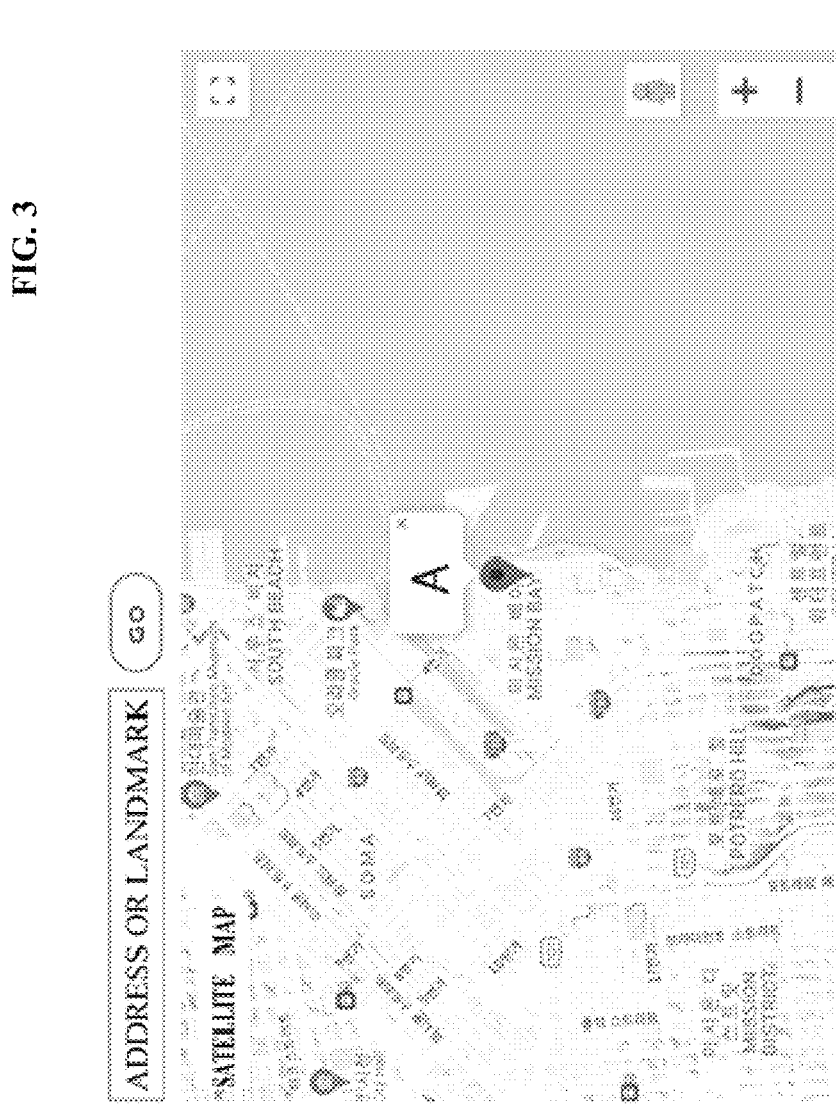
FIG. 3 is an exemplary view for describing a branch point registration method according to one embodiment of the present invention.
Figure 4:
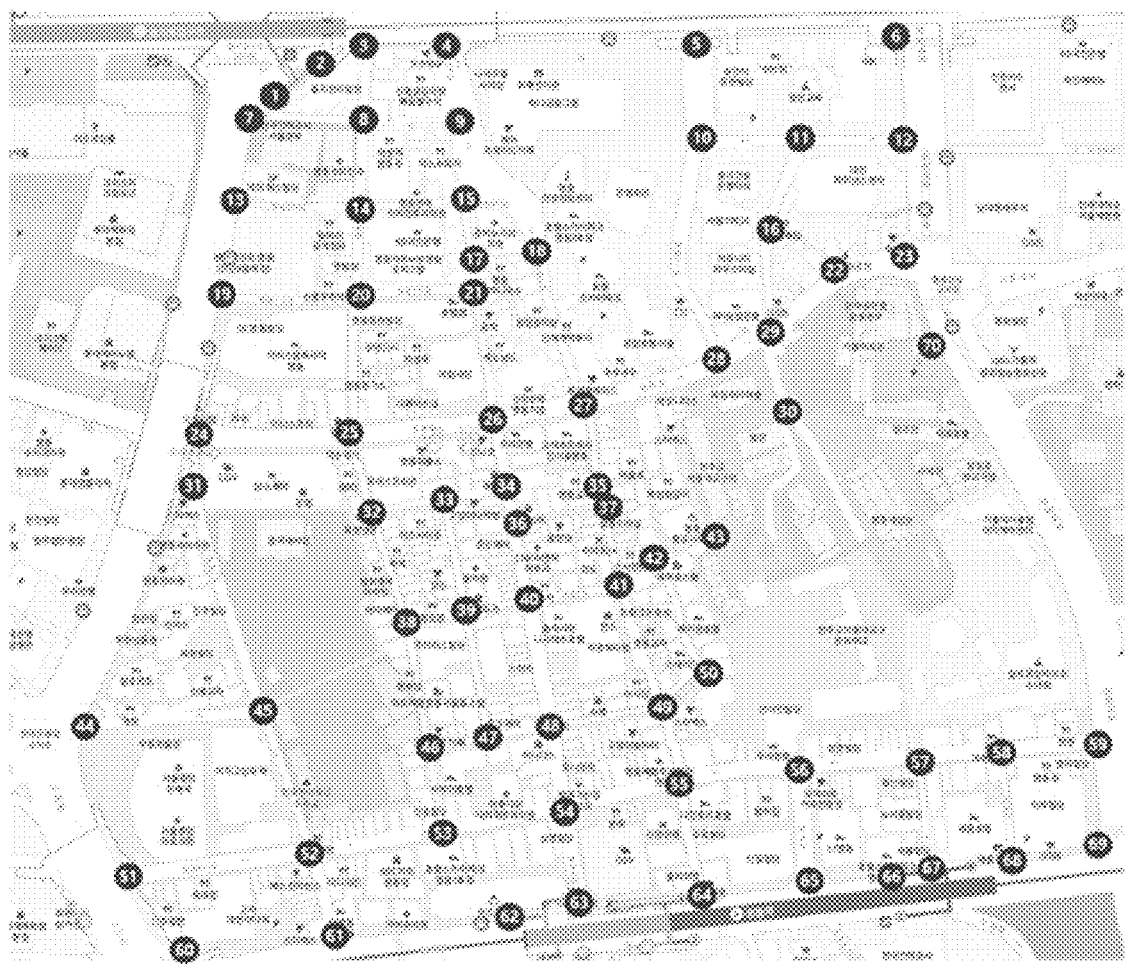
FIG. 4 is an exemplary view for describing a case where a branch point is displayed on a map according to one embodiment of the present invention.

FIG. 3 is an exemplary view for describing a branch point registration method according to one embodiment of the present invention, and FIG. 4 is an exemplary view for describing a case where a branch point is displayed on a map according to one embodiment of the present invention.

Referring to FIG. 3, the data registration processor 210 may call a map by selecting the above-ground or underground floor of a corresponding area in order to designate a branch point on the map. In this case, a floor map within a facility may use images or photographs provided by a business operator, but is not limited thereto. When a branch point on the map is selected, the data registration processor 210 may store and register the branch point in the database 250 together with an ID of the branch point consisting of the latitude, longitude, and floor of the corresponding point. The ID of the branch point is described as consisting of latitude, longitude, and floor as one example, but is not limited thereto and may be changed according to an operator's needs. In this case, when the location of the branch point changes due to a change in the location of a crosswalk, a change in the structure of a facility, or the like, the data registration processor 210 may update branch point information to the latest version through editing such as deleting or resetting the branch point.

When branch points ①, ②, ③, . . . designated in the above-described manner are shown on the map, it may be as shown in FIG. 4.

In addition, referring to FIG. 4, the map may include not only above-ground but also underground facilities such as major underground shopping malls. From a pedestrian's perspective, a movement line is divided into routes in units of branch points, and in order to designate all two or more route selection points that the pedestrian encounters while walking on the street as branch points, the data registration processor 210 may also designate, as branch points, alleys, crosswalks, and facilities such as bus stops on the ground as well as underground passage entrances and exits, stairs and elevators of buildings and facilities, subway platforms, or the like, where floors change. Accordingly, in the present embodiment, when storing the branch point location information, the data registration processor 210 also reflects the altitude information including floors.

The data registration processor 210 may determine a branch point in a specific area and match and register an ID of the determined branch point and location information on a map, perform processing and identification (ID) assignment for each of the at least one video provided from the video providing server 300 according to a preset processing standard, and match and manage a spot associated with each video, branch point information for each timeline, and information on an entire movement line connecting branch points of all timelines. The preset processing standard may refer to a standard that allows videos registered and provided to the video providing server 300 by a specific or unspecified individuals to be processed into a format for providing location-based video services and include preset information. The video providing server 300 may refer to a component that is provided in the form of a web service, allowing specific or unspecified individuals, such as influencers, business owners, or the like, to register videos they want.

Figure 5:
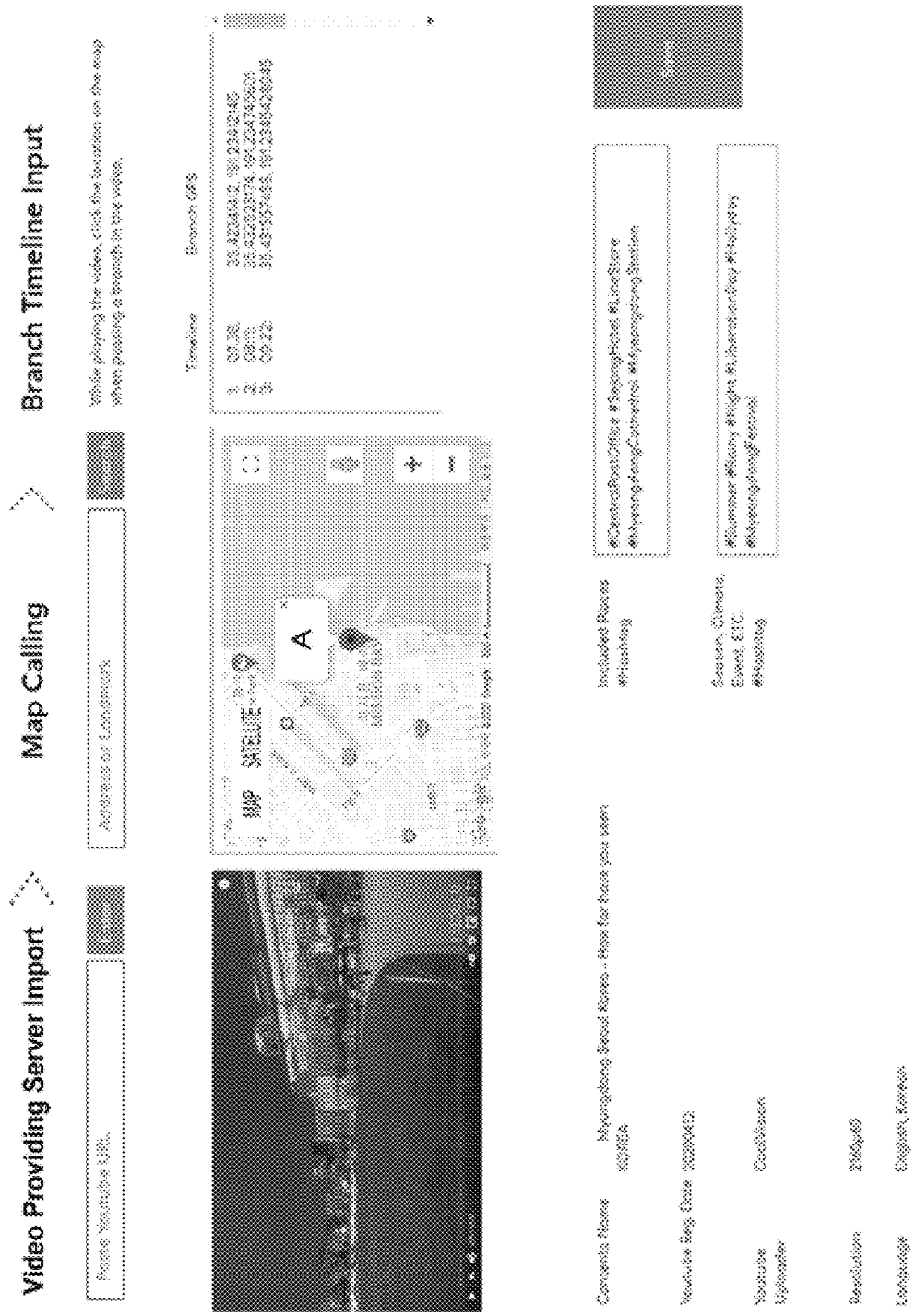
FIG. 5 is an exemplary view for describing a method of matching a timeline of a video and location information on a map according to one embodiment of the present invention.

When the branch point in the specific area is registered, the data registration processor 210 may register a video of the corresponding area in association with location information, where, as illustrated in FIG. 5, the registration may be performed in a manner of importing a video to be associated with location information and a map of the corresponding area and then playing the video, and selecting points displayed on a screen on the map in units of branch points. In this case, a playback timeline of the video and an ID of the clicked branch point of the map may be extracted together and the movement route of the video may be recorded in units of branch points. This may be performed directly by the user through the user terminal 100 or through an artificial intelligence (AI) algorithm, but is not limited thereto, and may be performed through an operator of the location-based video service server 200. The data registration processor 210 may store, edit, or delete location information for each timeline for a specific video.

When the video is registered, the data registration processor 210 may set the movement route of the video in units of branch points by matching the video playback timeline with the ID of the branch point selected on the map.

When the video is processed, the data registration processor 210 may add, edit, or delete, based on the preset processing standard, video information including at least one of the video's title, creation date, registrant, thumbnail, theme, playback time, editing language, subtitle, resolution, hashtag, file size, file format, source location, streaming URL information, area, and included spots for each video, and classify each video according to classification criteria including a chronological order, a theme according to nature of delivered content, a temporary event, a season, and weather and assign a hashtag.

FIG. 5 is an exemplary view for describing a method of matching a timeline of a video and location information on a map according to one embodiment of the present invention.

Referring to FIG. 5, when an administrator of the location-based video service server 200 or a user of the user terminal 100 enters a source location or streaming URL information of the video to be registered, the data registration processor 210 may request and receive the corresponding video from the video providing server 300, register the video in the database 250 together with the title, creation date, registrant, language provided, and resolution, and import a map corresponding to a location displayed on the screen of the video and then play the video. In this case, the data registration processor 210 may select a playback location of the video displayed on the display 270 on the map, compare branch point information with location information on the map, and additionally register and store the ID of the branch point and the timeline information of the video together. In this case, video registration processing may be performed according to selection information by the administrator of the location-based video service server 200 or the user of the user terminal 100 or a preset artificial intelligence algorithm. Here, when location information registration for each timeline of the video is completed, the data registration processor 210 may additionally register a hashtag (for example, a hashtag about places such as an area name, nearby hot spots, landmarks, or the like, or a hashtag about characteristic elements such as a season, day and night, weather, or specific events or themes) for the video.

When location information about the branch point is set, the data registration processor 210 may specify a radius range corresponding to the location information about the branch point. In this case, the radius range may refer to an area set to be considered as a location of the branch point based on the branch point. For example, when the radius range is set to 3 m, the data registration processor 210 may prevent duplication of GPS coordinate values for each branch point when assigning location information for each timeline, and replace the location information with the ID of the branch point.

The data registration processor 210 may match at least two of location information including GPS coordinates and altitude information of the registered spot, spot content information, spot content use-related information including user reviews, and related videos, and store and manage the matched at least two in the database 250. In this case, the data registration processor 210 may store, edit, or delete location information about the spot.

For example, spot content information may include a name, a classification category, an introduction, contact information, an address, a photo, products for sale, sales prices, a hashtag, and the like, and information related to spot content use may further include, in addition to the user reviews described above, user evaluations, questions and answers, messages sent and received with users, or the like.

In this case, the spot may include a business place, a facility, and a public place, including a tourist attraction, a historical site, a performance hall, a restaurant, a store, a market, a shopping mall, a service facility, an accommodation, an amusement facility, a festival site, a bus stop, and a subway station, and is not limited thereto.

Figure 8:
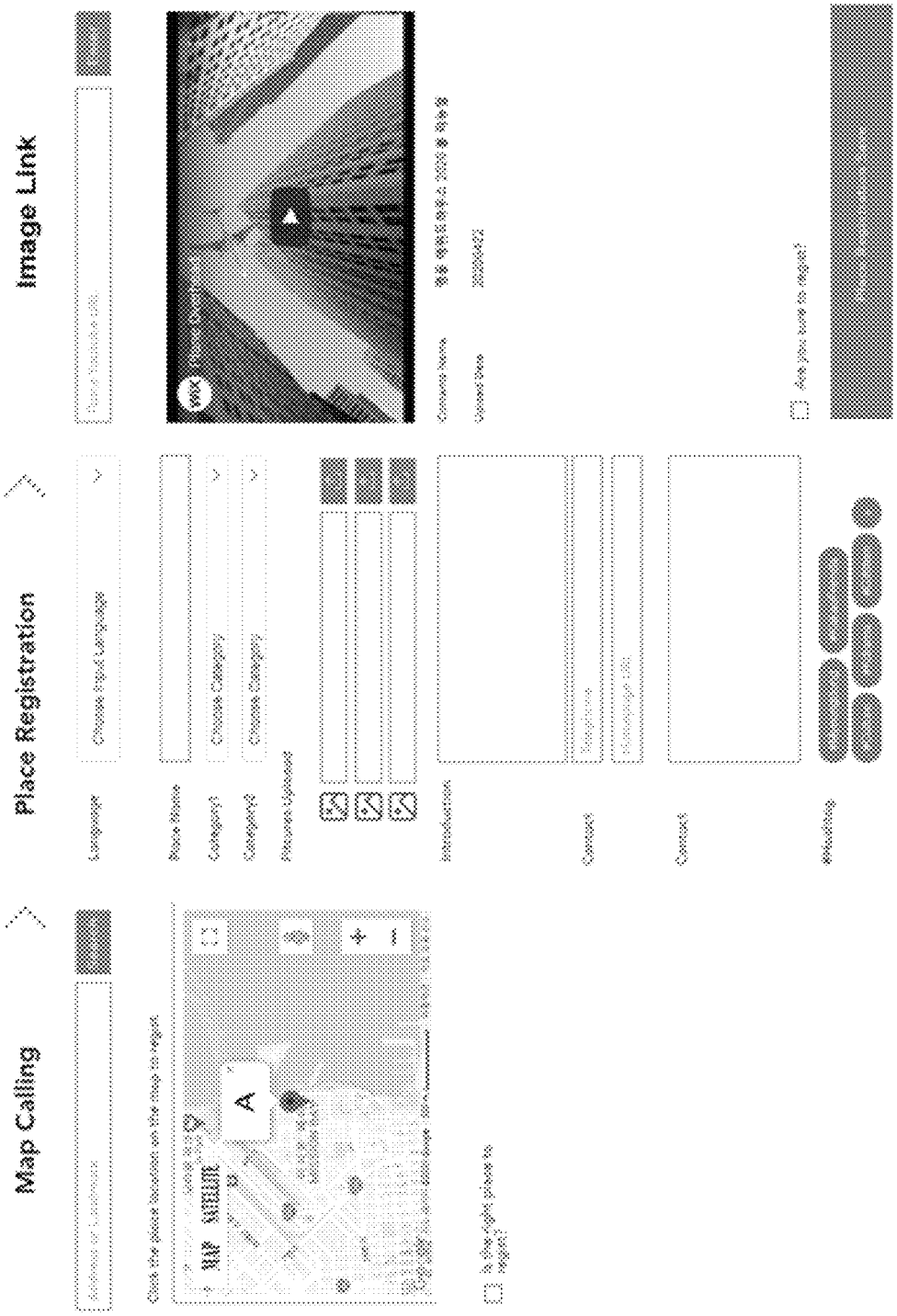
FIG. 8 is an exemplary view for describing a method of registering a spot, location information on a map, and a related video according to one embodiment of the present invention.

FIG. 8 is an exemplary view for describing a method of registering a spot, location information on a map, and a related video according to one embodiment of the present invention. Referring to FIG. 8, the data registration processor 210 may import a map with the address of a spot to register the location of the spot, according to the operation control of the administrator of the location-based video service server 200 or the user of the user terminal 100 and select a point where the corresponding spot is located. In addition, the data registration processor 210 may register the name, the category, photos, the introduction, contact information, the hashtag, and the like of the spot. In this case, the data registration processor 210 may perform the registration in various languages. In addition, when there is a video for the spot to be registered, the data registration processor 210 may register the video in association with the spot.

The data registration processor 210 may display the stored location information on a web page upon request. Registration of the location information about the spot and videos described above may be performed by accessing the location-based video service server 200 through an administrator terminal (not illustrated) or the user terminal 100. Meanwhile, registration of the location information of the branch point may be performed only through a pre-designated administrator terminal (not illustrated) or only by access through identification information about the designated administrator.

The video provider 220 may provide a spot list and a map of a corresponding area matched to a location-related search word when the search word is received from the user terminal 100, playlist by searching a video including at least one spot selected by the user in response to a request for the video including the at least one spot, and provide the video according to the playlist. That is, the video provider 220 transmits the video to the user terminal 100 so that the user may check the video.

In this case, when the user inputs a location-related search word including an area, an address, a landmark, or the like, in order to facilitate the input, the video provider 220 may provide customized search information related to the search word, including a synonym, a search word group, a hashtag, and the like for search.

Figure 6B:
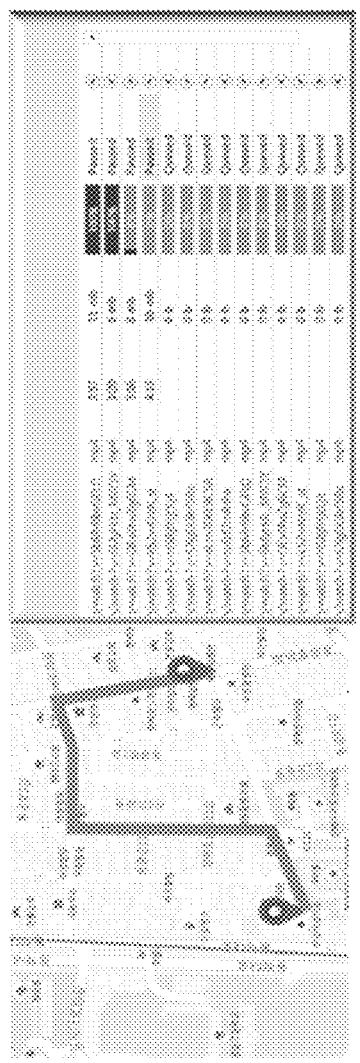
FIGS. 6A to 6C are exemplary views for describing a method of providing a location-based video service according to one embodiment of the present invention.
Figure 6C:
Figure 6A:
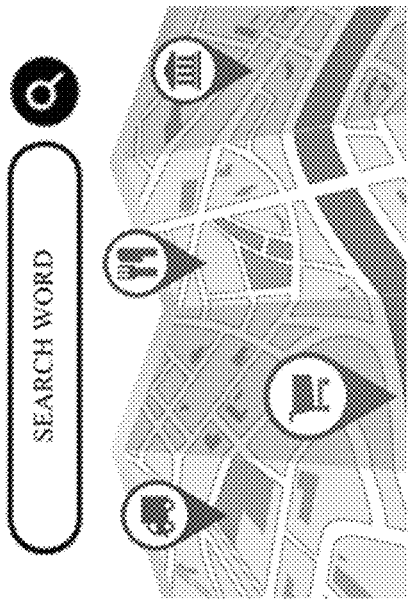

FIGS. 6A to 6C are exemplary views for describing a method of providing a location-based video service according to one embodiment of the present invention. Referring to FIGS. 6A to 6C, when the video provider 220 receives a search word including an area, a spot, or a landmark from the user terminal 100, the video provider 220 may provide a list of major spots together with a map of the corresponding area. Then, the user may select at least one spot of interest through the user terminal 100 and request a video containing the corresponding spots. The video provider 220 may combine videos of passing through all spots selected by the user in the form of a playlist in units of branch points and then provide the combined video to the user terminal 100. While watching the video composed of the playlist through the user terminal 100, the user may additionally check the real-time movement route on the map and the list of spots around a current location.

Figure 9:
FIG. 9 is an exemplary view for describing a method of requesting a location-based video according to one embodiment of the present invention.

FIG. 9 is an exemplary view for describing a method of requesting a location-based video according to one embodiment of the present invention. Referring to FIG. 9, in response to a request for a video based on a keyword "Myeongdong Cathedral," the video provider 220 may provide a map of the Myeongdong area where the spot is located and major nearby spots in the form of a list to the user terminal 100. Then, when the video provider 220 receives the spot selected by the user from the user terminal 100, the video provider 220 may display the corresponding spot with a marker on the map in real time and allow a re-search request for the video of passing through the selected spot. In this case, start and end points of the video may be set in various ways, such as clicking of a display order of markers or the start and end points on the map. In this case, the video provider 220 may search the video registered through the data registration processor 210 when searching the video and generate a playlist.

Figure 10:
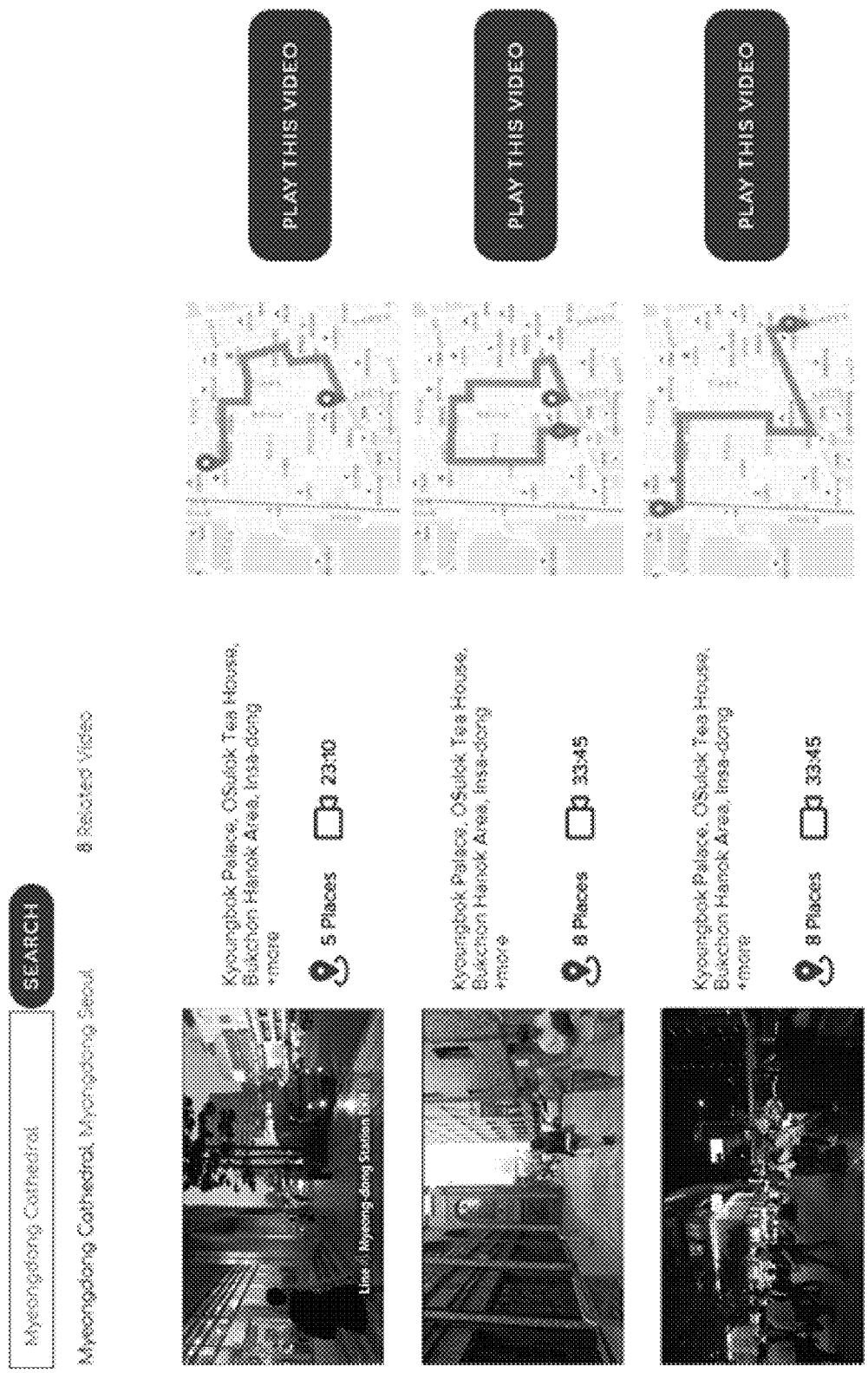
FIG. 10 is an exemplary view for describing a method of providing a video playlist according to one embodiment of the present invention.

FIG. 10 is an exemplary view for describing a method of providing a video playlist according to one embodiment of the present invention. Referring to FIG. 10, the video provider 220 may provide a number of videos of passing through spots selected by the user, allowing the number of spots included in a corresponding video and a video playback time to be displayed and allowing a map showing a movement line of the video to be displayed in advance before the video, which may make video selection of the user easier. The number of spots necessarily includes spots selected by the user, but may also be a number that additionally reflects major spots in a corresponding area among spots not selected by the user.

The video provider 220 may generate the playlist to include all of at least one spot selected by the user by combining a plurality of videos in units of branch points when there is no video including all of the at least one spot in pre-stored videos.

Figure 7A:
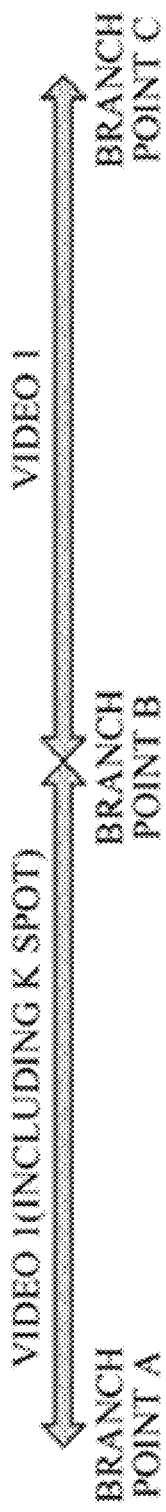
FIGS. 7A to 7C are exemplary views for describing a method of generating a location-based video according to one embodiment of the present invention.
Figure 7B:
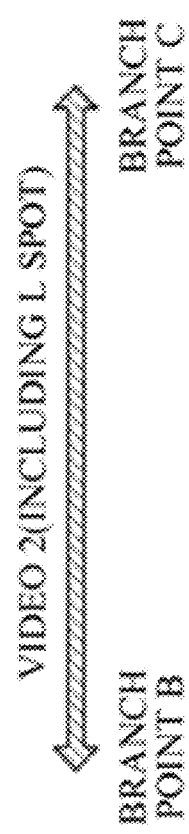
Figure 7C:
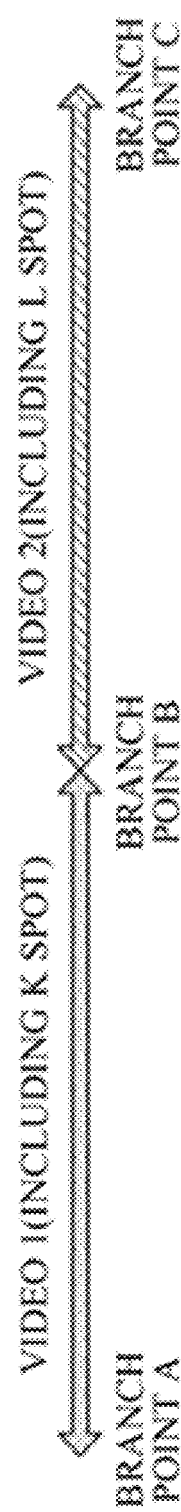

FIGS. 7A to 7C are exemplary views for describing a method of generating a location-based video according to one embodiment of the present invention. Referring to FIGS. 7A to 7C, for example, in a video titled "1", a selected K spot exists between a branch point A and a branch point B, but when an L spot, which is another selected spot, does not exist between the branch point B and a branch point C (FIG. 7A), and exists in a video titled "2" (FIG. 7B), the video provider 220 generates the playlist to play a section between the branch point A and the branch point B in the "1" video and play a section between the branch point B and the branch point C in the video titled "2" by connecting the section between the branch point B and the branch point C in the video titled "2" to the timeline at a time point when the playback up to the branch point B is finished (FIG. 7C). In this way, when the user selects the start point, a stopping point (including a plurality of spots), an end point, and the like, the video provider 220 may provide the playlist consisting of a plurality of videos. That is, the video provider 220 may generate the playlist such as [video '1', branch point A-B section, spot null]+[video '1', branch point B-C section, spot γ]+[video '1', branch point C-D section, spot null]+[video '2', branch point D-E section, spot γ]+[video '2', branch point E-F section, spot ε]+[ . . . ]+ . . . . In this case, when there is no spot to pass through at a branch point section in the entire movement route, the video being played may be configured to be continuously played up to a connecting branch point of a newly connected video.

The video provider 220 may display and provide the number of spots included in the video, a video playback time, and a movement line on the map before the video is played according to the playlist.

When the location-related search word is a theme, the video provider 220 may generate a spot list so that a spot highly related to the theme is preferentially exposed or generate a spot list according to spot list generation criteria preset in relation to the theme when the spot and the map are provided, and provide the spot list.

Specifically, the video provider 220 may provide a map with major spots in an area when the user searches for the area, an address, or a landmark with a search word, the user may select a desired spot from the spot list provided from the video provider 220, and the selected spot may be displayed in the form of a marker on the map. Then, the user may request a video of moving through the selected spot. In this case, during a process of selecting a spot, the video provider 220 may allow the user to select a theme (e.g., tourism, history, culture, mukbang, K-Pop, K-beauty, movie/drama, or the like), and may rearrange and provide the spot list according to the selected theme. For example, when the user selects the theme <history> and searches for an area, the video provider 220 may rearrange spots so that the spots related to historical sites are preferentially displayed on the spot list and display historical introduction videos related thereto in conjunction.

For another example, when the user selects the theme <K-Pop A idol group> and searches for an area, the video provider 220 may generate the spot list to list, in chronological order, the spots representing A idol group's early practice room, domestic and international performance venues, including street performances, album filming sites, and A idol group's agency headquarters, and the like, and display a video together with a corresponding location.

Figure 11:
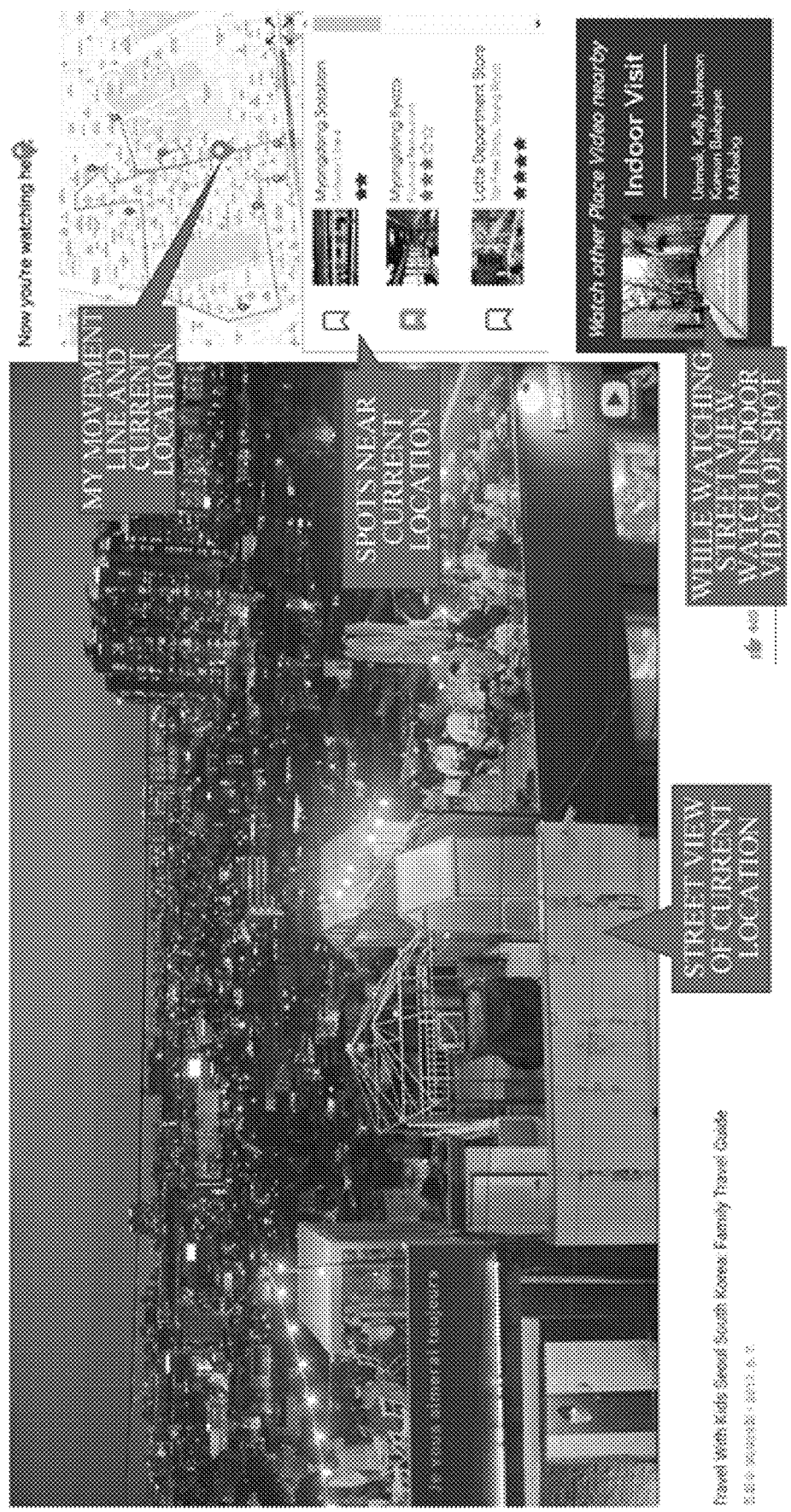
FIG. 11 is an exemplary view for describing a method of providing a location-based video according to one embodiment of the present invention.

FIG. 11 is an exemplary view for describing a method of providing a location-based video according to one embodiment of the present invention. Referring to FIG. 11, the video provider 220 may transmit a video selected by the user to the user terminal 100 so that the video may be checked. In this case, the video provider 220 may generate and provide a video so that the spot selected by the user and a movement line may be displayed in advance in the form of a marker and line on the map before the video is played. In addition, the video provider 220 may generate a video so that, when the video is played, a location shown on a map on a screen may be dynamically displayed in the form of different markers in real time depending on a timeline and a list of nearby spots may be dynamically displayed as the movement line moves. Here, the user may click on any one in the list of the spots through the user terminal 100 to bookmark it or check detailed information about the spot in a pop-up form. In addition, by providing guidance in the form of a banner when there is an indoor video of a specific spot or an event video with a different theme that has occurred at the spot through the user terminal 100, the user may do watching in conjunction with another video.

The video provider 220 may generate a video so that the map may be changed to a corresponding map when switching between the inside and outside of a building or facility or movement between floors during video playback is made.

The event processor 230 may perform control such that pre-generated event information matched to location information about the spot and location information about the branch point is executed or stopped as a real-time location changes with playback according to a playback timeline of the video.

The event processor 230 may arbitrarily control a video playback speed when the video is played, and may control a video playback time point by arbitrarily moving a marker indicating a current location on the map on a line indicated by the user or provide a video list of a new line passing through a point when a marker is located in an area corresponding to the point beyond the indicated line.

The event processor 230 performs control such that, when the video is played, at least a marker indicating a spot on the map, detailed information including at least one of a photo, a name, a star rating, and discount information about a nearby spot based on a playback location of the video, an additional video including an indoor video of the nearby spot, a video for detailed explanation, and a promotional video, and a combination thereof is output together or output thereof is stopped.

Referring to FIG. 11, as the user watches the video and the real-time location changes with the timeline of the video, the event processor 230 compares pre-generated event information and location information about the spot and branch point and executes event information corresponding to the corresponding spot and branch point or stops the execution thereof.

The event information may be provided in the form of a link and banner so that users may check the information, but is not limited thereto.

In this case, the event processor 230 may provide additional information by objectifying the places, facilities, goods, and the like that appear in the video and generating events corresponding to them. When the user is watching the video on the web, the event processor 230 may provide event information in the form of an overlay so that the user may receive the information through a click. If the user is watching the video on a video app, when an object click event is set using a 3D engine such as Unity, the event processor 230 may allow the user to check event information such as indoor movement, performance viewing, guide, shopping, communication progress, or the like, by clicking on an object. In addition, the event information may include a time event of a store (e.g., a clothing store) and an event based on user location authentication. Meanwhile, the event information may be provided in the form of informing of nearby events (e.g., discounts, history, meetings, work information) based on the current location.

The data statistics processor 240 may generate search word-related customized search information to be provided when a search word is input by collecting any one of the search word input by the user, a spot to be passed through, a video requested to be provided, and a combination thereof through the video provider 220 and designating or cancelling a search word group or generating a search word hashtag based on the collected one. The data statistics processor 240 may transmit the search word-related customized search information to the video provider 220 to support the user's search word input.

In addition, the data statistics processor 240 may process statistics on events and themes created for each area so that the statistics may be used as data for setting new events and themes.

The database 250 may store information related to the location-based video service server 200, including branch points, spots, videos, and location information.

When there is no video including at least one spot selected by the user in pre-stored videos, the content transaction processor 260 may transmit a new video registration request including the corresponding spot to the user terminal 100 or the video providing server 300, and then store a returned new video in the database 250 and calculate a cost for the new video.

The display 270 may be a component for displaying various information related to the location-based video service server 200 on the screen.

The controller 280 may be a component for controlling all components, such as the data registration processor 210, the video provider 220, the event processor 230, the data statistics processor 240, the content transaction processor 260, and the like, in the location-based video service server 200.

The video providing server 300 may be a component for storing at least one video and providing the stored video according to a request from the location-based video service server 200.

Figure 12:
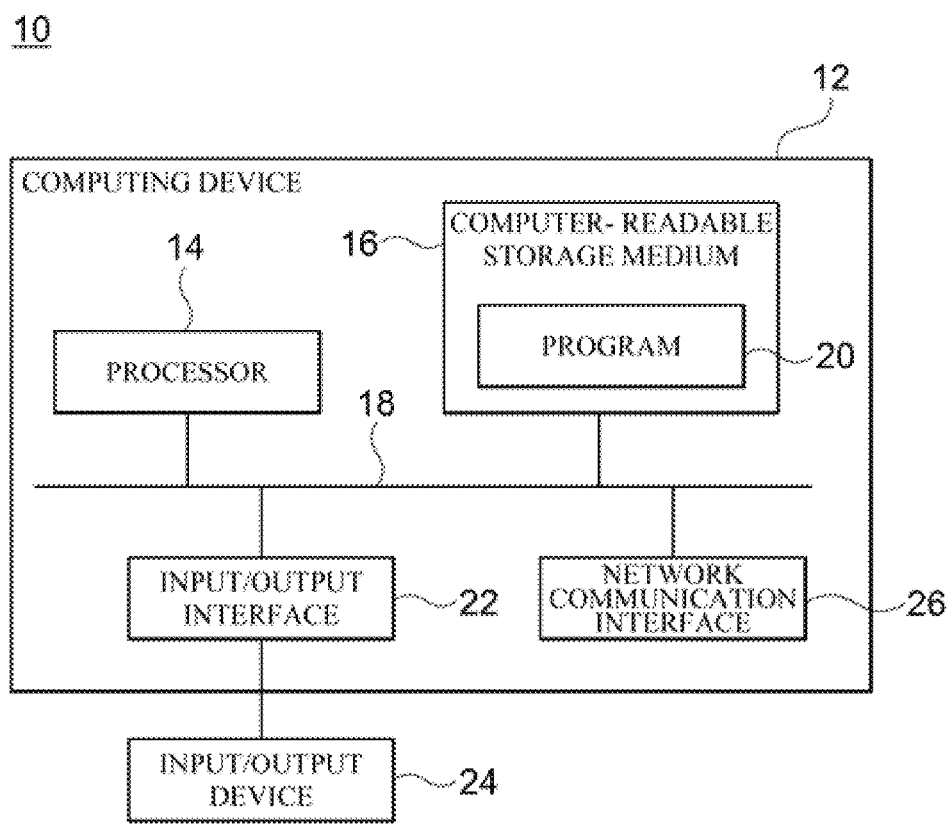
FIG. 12 is a block diagram for illustrating a computing environment including a computing device according to one embodiment of the present invention.

FIG. 12 is a block diagram illustrating an exemplary computing environment 10 that includes a computing device suitable for use in exemplary embodiments. In the illustrated embodiment, each component may have a different function and capability in addition to those described below, and additional components may be included in addition to those described below.

The illustrated computing environment 10 includes a computing device 12. In one embodiment, the computing device 12 may be the location-based video service system 1000. In addition, the computing device 12 may be the location-based video service server 200.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as one of components constituting the computing device 12, or may be connected to the computing device 12 as a separate device distinct from the computing device 12.

According to the embodiments of the present invention described above, it is possible to provide customized videos that include a user's personal tastes, themes, and desired locations and possible to provide additional information related to use of spot content, including user reviews, to the videos, thereby expecting the effect of providing more various information to the user, and at the same time, encouraging communication with business operations, or the like.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A location-based video service system comprising:
a location-based video service server configured to register a branch point, a spot, a video, and location information and generate and provide at least one video corresponding to location information matched to a location-related search word as a playlist according to a timeline when a video request is received from a user terminal based on the location-related search word and the spot, the video included in the playlist including all of the spots selected by a user; and
a video providing server configured to store at least one video and provide the stored video according to a request from the location-based video service server,
wherein the location-based video service server includes:
a data registration processor configured to determine a branch point in a specific area and match and register a branch point identification (ID) consisting of a latitude, longitude, and floor of the determined branch point and location information on a map, perform processing and ID assignment for each of the at least one video provided from the video providing server according to a preset processing standard, and match and manage a spot associated with each of the at least one video, branch point information for each timeline, and information on an entire movement line connecting branch points of all timelines with each video; and
a video provider configured to provide a spot list and a map of a corresponding area matched to the location-related search word when the location-related search word is received from the user terminal, generate a playlist by searching a video including at least one spot selected by the user in response to a request for the video including the at least one spot, and provide the video according to the playlist, the video provider being configured to generate the playlist to include all of at least one spot selected by the user by combining a plurality of videos including the at least one spot selected by the user in units of branch points when there is no video including all of the at least one spot selected by the user in pre-stored videos.

2. The location-based video service system of claim 1, wherein the data registration processor designates the branch point on the map that occurs while a pedestrian is moving on foot or by other means of transportation including a vehicle, and matches location information including global positioning system (GPS) coordinates and altitude information of the designated branch point and an ID of the branch point and stores and manages the matched location information and ID in a database.

3. The location-based video service system of claim 2, wherein the data registration processor sets a movement route of the video in units of branch points by matching a video playback timeline with the ID of the branch point selected on the map when the video is registered.

4. The location-based video service system of claim 2, wherein when the video is processed, the data registration processor adds, edits, or deletes, based on the preset processing standard, video information including a video's title, creation date, registrant, thumbnail, theme, playback time, editing language, subtitle, resolution, hashtag, file size, file format, source location, streaming URL information, area, and included spots for each video, and classifies each video according to classification criteria including a chronological order, a theme according to nature of delivered content, a temporary event, a season, and weather and assigns a hashtag.

5. The location-based video service system of claim 2, wherein when the location information about the branch point is set, the data registration processor specifies a radius range corresponding to the location information about the branch point.

6. The location-based video service system of claim 1, wherein the spot includes a business place, a facility, and a public place, including a tourist attraction, a historical site, a performance hall, a restaurant, a store, a market, a shopping mall, a service facility, an accommodation, an amusement facility, a festival site, a bus stop, and a subway station, and
the data registration processor matches at least two of location information including GPS coordinates and altitude information of the registered spot, spot content information, spot content use-related information including user reviews, and related videos, and stores and manages the matched at least two in a database.

7. The location-based video service system of claim 1, wherein the location-based video service server further includes an event processor configured to perform control such that pre-generated event information matched to location information about the spot and location information about the branch point is executed or stopped as a real-time location changes with playback according to a playback timeline of the video.

8. The location-based video service system of claim 7, wherein the event processor performs control such that, when the video is played, at least one of a marker indicating a spot on the map, detailed information including at least one of a photo, a name, a star rating, and discount information about a nearby spot based on a playback location of the video, an additional video including an indoor video of the nearby spot, a video for detailed explanation, and a promotional video, and a combination thereof is output together or output thereof is stopped.

9. The location-based video service system of claim 7, wherein the event processor is able to arbitrarily control a video playback speed when the video is played, and controls a video playback time point by arbitrarily moving a marker indicating a current location on the map on a line indicated by the user or provides a video list of a new line passing through a random a point when a marker is located in an area corresponding to the point beyond the indicated line.

10. The location-based video service system of claim 1, wherein the location-based video service server further includes a data statistics processor configured to generate search word-related customized search information to be provided when a search word is input by collecting any one of the search word input by the user, a spot to be passed through, a video requested to be provided, and a combination thereof through the video provider and designating or cancelling a search word group or generating a search word hashtag based on the collected one.

11. The location-based video service system of claim 1, wherein the video provider displays and provides the number of spots included in the video, a video playback time, and a movement line on the map before the video is played according to the playlist.

12. The location-based video service system of claim 1, wherein the location-related search word includes an area, an address, a place, a landmark, or a theme.

13. The location-based video service system of claim 1, wherein when the location-related search word is a theme, the video provider generates a spot list so that a spot related to the theme is preferentially exposed in the spot list or generates a spot list according to spot list generation criteria preset in relation to the theme when the spot list and the map are provided, and provides the spot list.

14. The location-based video service system of claim 1, wherein the location-based video service server further includes a content transaction processor configured to, when there is no video including at least one spot selected by the user in pre-stored videos, transmit a new video registration request including the corresponding spot to the user terminal or the video providing server, and then store a returned new video in a database and calculate a cost for the new video.

15. The location-based video service system of claim 1, further comprising a user terminal for transmitting and receiving information by being communicatively connected to the location-based video service server, generating commands for location-based video services, including inputting the location-related search word and requesting a video, and outputting location-based video service-related information transmitted from the location-based video service server.

16. A location-based video service server comprising:
a database;
a data registration processor configured to determine a branch point in a specific area and match and register a branch point identification (ID) consisting of a latitude, longitude, and floor of the determined branch point and location information on a map, perform processing and ID assignment for each of at least one video provided from a video providing server according to a preset processing standard, and match and manage a spot associated with each of the at least one video, branch point information for each timeline, and information on an entire movement line connecting branch points of all timelines with each video; and
a video provider configured to provide a spot list and a map of a corresponding area matched to a location-related search word when the location-related search word is received from a user terminal, generate a playlist by searching a video including at least one spot selected by a user in response to a request for the video including the at least one spot, and provide the video according to the playlist, the video provider being configured to generate the playlist to include all of at least one spot selected by the user by combining a plurality of videos including the at least one spot selected by the user in units of branch points when there is no video including all of the at least one spot selected by the user in pre-stored videos.

17. The location-based video service server of claim 16, further comprising an event processor configured to perform control such that pre-generated event information matched to location information about the spot and location information about the branch point is executed or stopped as a real-time location changes with playback according to a timeline of the video.

18. The location-based video service server of claim 16, further comprising a data statistics processor configured to generate search word-relate customized search information to be provided when a search word is input by collecting any one of the search word input by the user, a spot to be passed through, a video, and a combination thereof through the video provider and designating or cancelling a search word group or generating a search word hashtag based on the collected one.

19. The location-based video service server of claim 16, further comprising a content transaction processor configured to, when there is no video including at least one spot selected by the user in pre-stored videos, transmit a new video registration request including the corresponding spot to the user terminal or the video providing server, and then store a returned new video in the database and calculate a cost for the new video.

* * * * *